United States Patent
Veneruso et al.

(10) Patent No.: US 8,555,956 B2
(45) Date of Patent: Oct. 15, 2013

(54) LINEAR INDUCTION MOTOR-OPERATED DOWNHOLE TOOL

(75) Inventors: Anthony F. Veneruso, Paris (FR); David McCalvin, Missouri City, TX (US); Dwayne May, Humble, TX (US); Fabien Cens, Massy (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 1735 days.

(21) Appl. No.: 11/640,637

(22) Filed: Dec. 18, 2006

(65) Prior Publication Data

US 2007/0295515 A1 Dec. 27, 2007

Related U.S. Application Data

(60) Provisional application No. 60/805,615, filed on Jun. 23, 2006.

(51) Int. Cl.
*E21B 34/06* (2006.01)

(52) U.S. Cl.
USPC .................. 166/66.7; 166/66.4; 166/66.6

(58) Field of Classification Search
USPC ............... 166/386, 66.4, 66.5, 66.6, 66.7
See application file for complete search history.

(56) References Cited

U.S. PATENT DOCUMENTS

| | | | |
|---|---|---|---|
| 2,901,210 A | | 8/1959 | Hebard |
| 4,454,457 A | * | 6/1984 | Nakamura et al. ............ 318/135 |
| 4,903,937 A | * | 2/1990 | Jakubiec et al. ................ 251/26 |
| 5,389,845 A | | 2/1995 | Brimhall |
| 2002/0108747 A1 | | 8/2002 | Dietz et al. |
| 2002/0159333 A1 | | 10/2002 | Hahn et al. |
| 2005/0087335 A1 | | 4/2005 | Vick |
| 2007/0289734 A1 | | 12/2007 | McDonald et al. |

FOREIGN PATENT DOCUMENTS

| | | |
|---|---|---|
| EP | 1236862 A3 | 9/2002 |
| EP | 1252440 B1 | 11/2005 |
| EP | 1252414 B1 | 10/2006 |
| GB | 1279670 A | 6/1972 |
| GB | 2345387 A | 7/2000 |
| GB | 2416552 A | 2/2006 |
| WO | 9306369 A1 | 4/1993 |

OTHER PUBLICATIONS

Dexter Magnetic Technologies, 'MagneGear Linear Magnetic Gear (LMG)—Magnetically Geared and Sprung Safety Valve', Internet site: http://www.dextermag.com/MagneGear-LMG.aspx?terms=&searchtype=0&fragment=True.

* cited by examiner

*Primary Examiner* — Brad Harcourt
(74) *Attorney, Agent, or Firm* — David J. Groesbeck; Brandon S. Clark

(57) ABSTRACT

A tool that is usable with a well includes a tool operator and a linear induction motor, which actuates the tool operator.

25 Claims, 7 Drawing Sheets

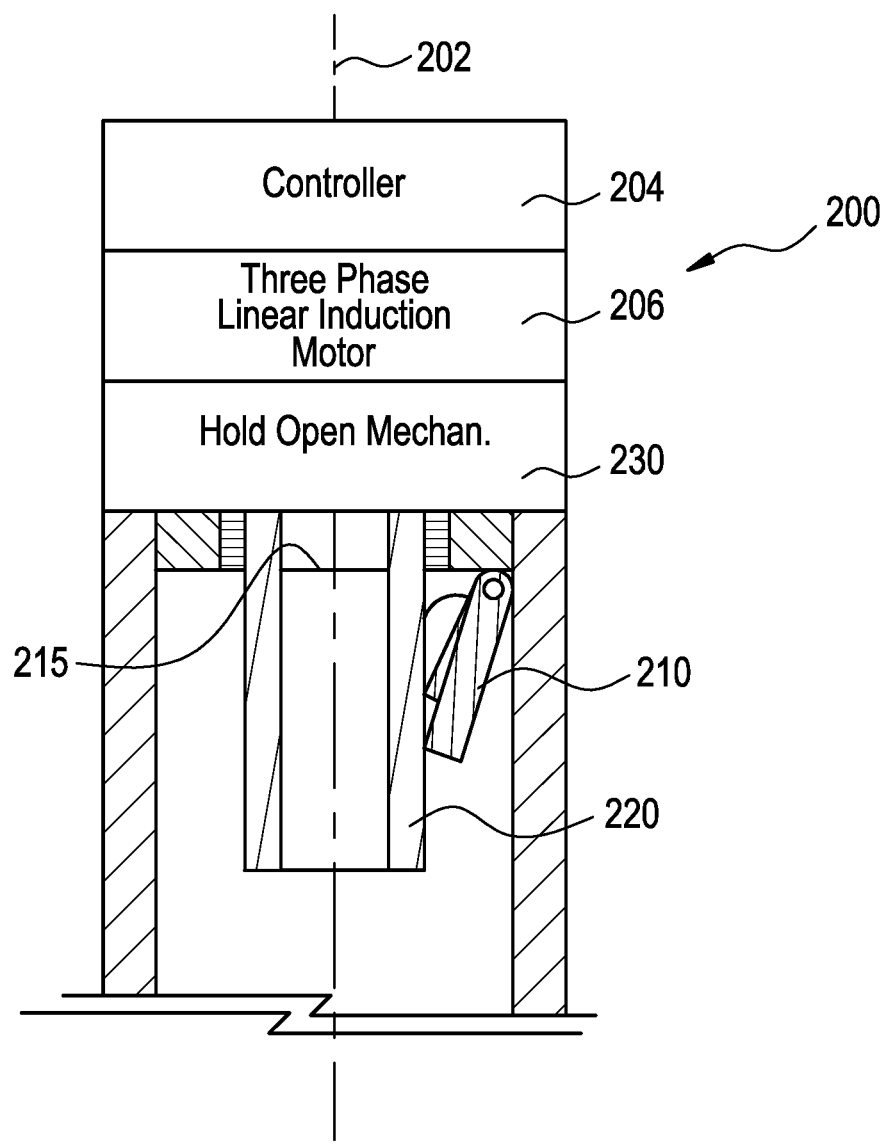

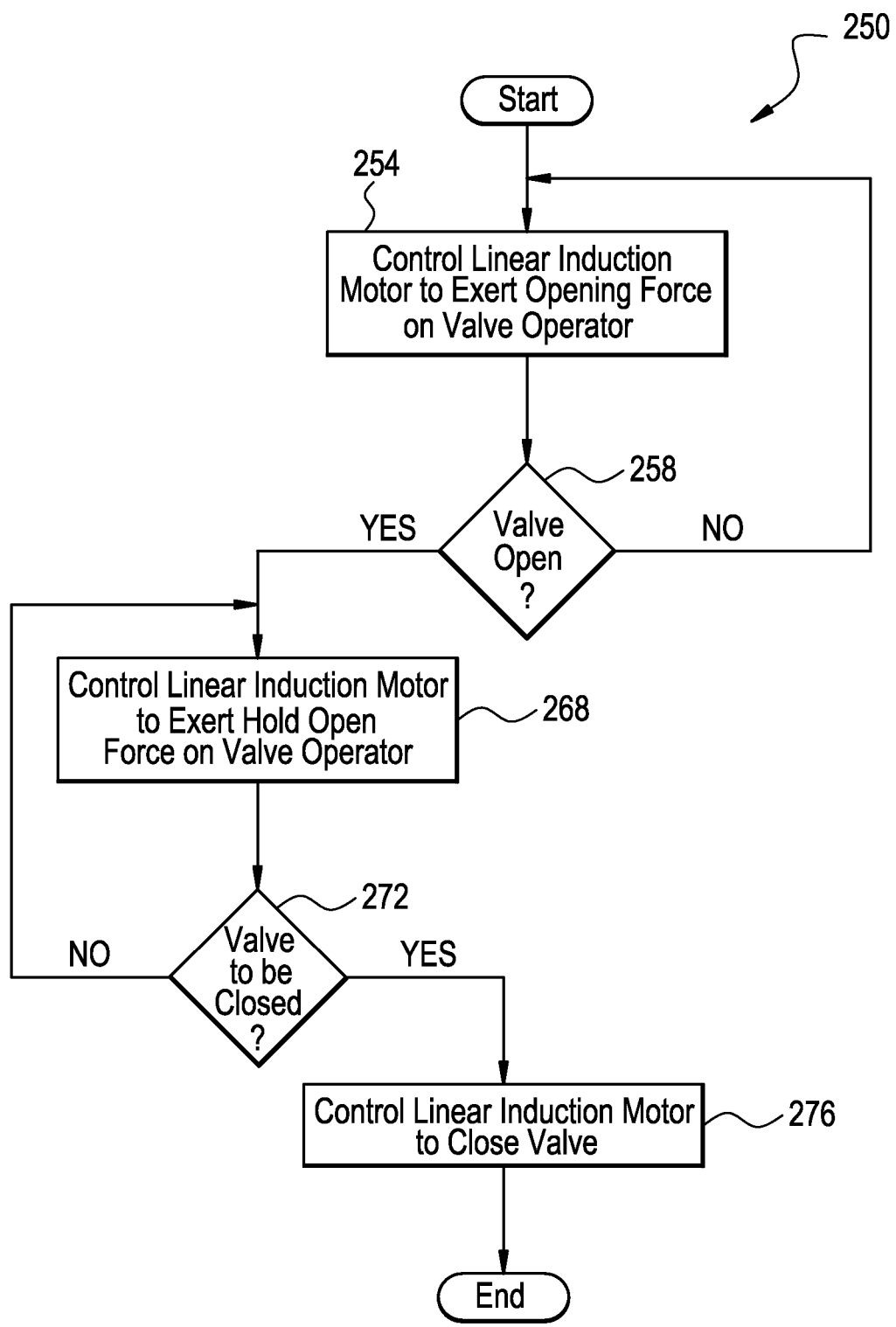

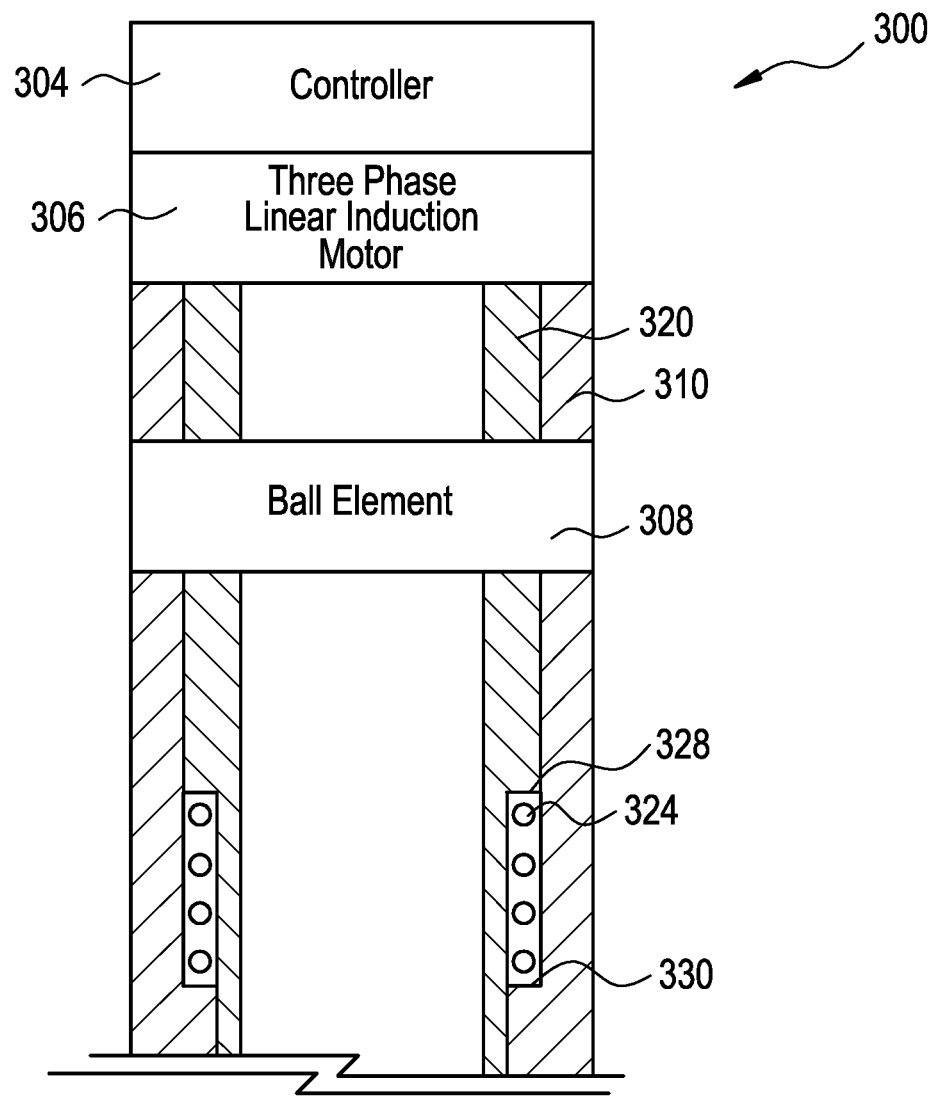

LINEAR INDUCTION MOTOR-OPERATED DOWNHOLE TOOL

This application claims the benefit under 35 U.S.C. §119 (e) to U.S. Provisional Application Serial No. of U.S. Provisional Application Ser. No. 60/805,615, entitled, "LINEAR INDUCTION MOTOR OPERATED ELECTRIC SAFETY VALVES," which was filed on Jun. 23, 2006, and is hereby incorporated by reference in its entirety.

BACKGROUND

The invention generally relates to a linear induction motor-operated downhole tool.

Valves typically are used in a well for such purposes as fluid flow control, formation isolation and safety functions. A common downhole valve is a hydraulically-operated valve, which is known for its reliable performance. However, hydraulically-operated valves have limitations.

For example, the use of a hydraulically-operated valve is depth-limited due to the high hydrostatic pressure acting against the valve at large depths, which may diminish the effective hydraulic pressure that is available to operate the valve. Furthermore, for deep applications, the viscous control fluid in a long hydraulic line may cause unacceptably long operating times for certain applications. In addition, a long hydraulic line and the associated connections provide little or no mechanism to determine, at the surface of the well, what is the true state of the valve. For example, if the valve is a safety valve, there may be no way to determine the on-off position of the valve, the pressure across the valve and the true operating pressure at the valve's operator at the installed depth.

Therefore, for some applications, an electrically-operated valve may be used in place of a hydraulically-operated valve. Conventional electrically-operated valves include solenoid-operated valves and complex motor-driven valves. Solenoids may be comparatively unreliable because they may require relatively high operating electrical currents and voltages to achieve the required levels of mechanical force and displacement. These factors exacerbate the problems with achieving reliable life of the valve, may stress electrical insulation and may require relatively complex controls and power sources to operate these devices.

SUMMARY

In an embodiment of the invention, a tool that is usable with a well includes a tool operator and a linear induction motor, which actuates the tool operator.

In another embodiment of the invention, a technique that is usable with a well includes operating a linear induction motor to actuate an operator of a tool that is located downhole in the well.

In yet another embodiment of the invention, a system that is usable with a well includes a valve element, a valve operator and a linear induction motor. The valve operator transitions the valve element from a first state to a second state. The linear induction motor actuates the valve operator to regulate whether the valve element is in the first state or the second state or an intermediate position. The first and second states may be opened and closed states of the valve or may be different open positions of the valve, for the case of a variable position valve.

Advantages and other features of the invention will become apparent from the following drawing, description and claims.

BRIEF DESCRIPTION OF THE DRAWING

FIG. 6 is a schematic diagram of an isolation valve according to an embodiment of the invention.

FIG. 7 is a flow diagram illustrating a technique to operate the isolation valve of FIG. 5 according to an embodiment of the invention.

FIG. 8 is a schematic diagram of a safety valve according to an embodiment of the invention.

DETAILED DESCRIPTION

Figure 1:
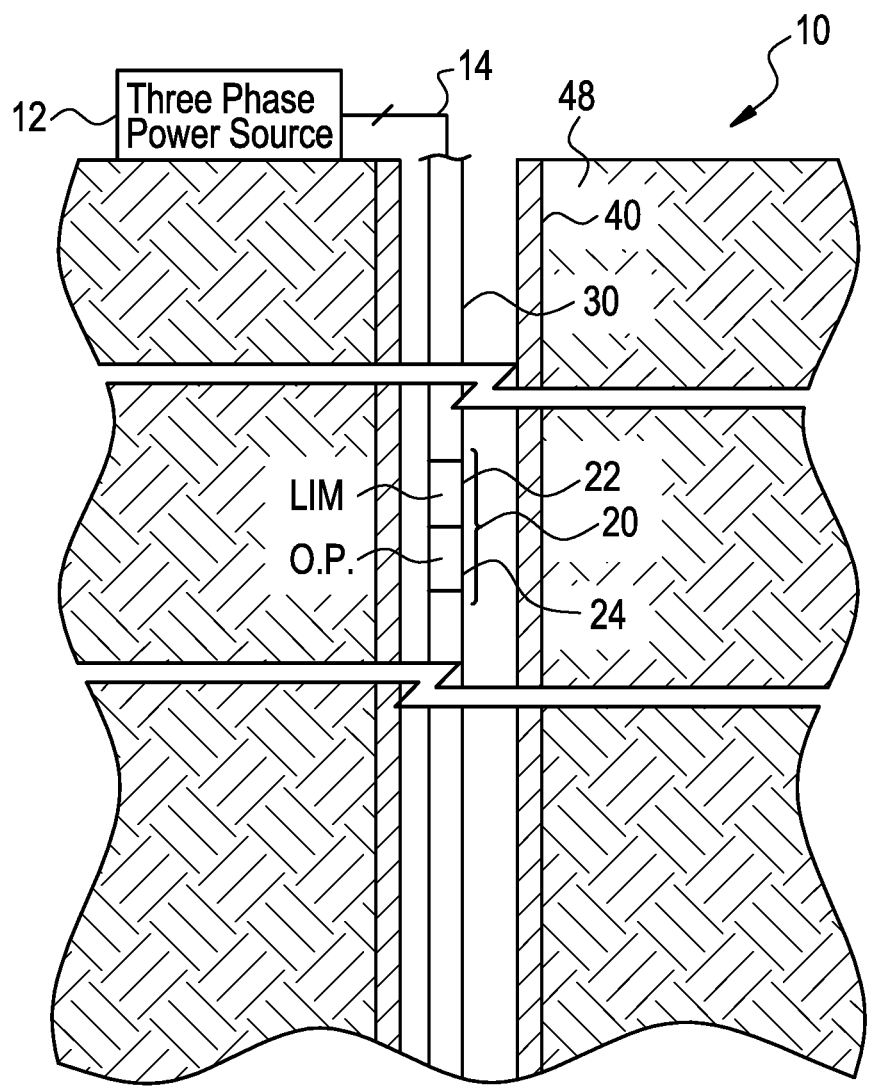
FIG. 1 is a schematic diagram of a well according to an embodiment of the invention.

Referring to FIG. 1, in accordance with embodiments of the invention described herein, a well 10 includes a tool 20, which has various states that are controlled through the action of a linear induction motor 22 of the tool 20. In this regard, the linear induction motor 22 may be operated to move a mechanical operator 24 of the tool 20 to transition the tool 20 to the desired state. As a more specific example, in accordance with some embodiments of the invention, the tool 20 may be a valve, and the linear induction motor 22 may be controlled to impart a movement to the mechanical operator 24 for purposes of changing the valve to a desired flow state, such as open or closed (as examples). In the exemplary embodiment that is depicted in FIG. 1, the well 10 includes a wellbore 48, which is lined by a casing string 40. It is noted, however, that in other embodiments of the invention, the tool 20 may be located in an uncased wellbore.

As depicted in FIG. 1, in accordance with some embodiments of the invention, the well 10 may be a subterranean well, although the well 10 may be a subsea well, in accordance with other embodiments of the invention. In a subsea well, in accordance with other embodiments of the invention, the tool 20 may be located in a subsea tree, in a subsea production pipe, or a riser pipe that is connected permanently or temporarily to the well. In any of these configurations, the tool 20 may be a valve to control a well flow or to provide formation or barrier isolation. As a non-limiting specific example, the tool 20 may be a flapper valve in a subsea tree. Thus, many variations that include marine, subterranean, downhole seabed and surface applications are contemplated, all of which are within the scope of the appended claims.

The tool 20 may be run into the well 10 via a variety of different conveyance mechanisms, such as an exemplary string 30 (coiled tubing, for example) that is depicted in FIG. 1. Thus, the tool 20 may be run downhole on such conveyance mechanisms as a coiled tubing, jointed tubing, a wireline, a slickline, etc. Furthermore, in accordance with the particular embodiment of the invention, the tool 20 may be run downhole, set in place and then, the conveyance mechanism that is used to run the tool 20 into the well 10 may be retrieved from the well.

The linear induction motor 22 may be a three phase linear induction motor, which receives power from a surface three phase power source 12. In this regard, the three phase power source 12 communicates power to three electrical communication lines 14 that extend downhole from the three phase power source 12. The communication of the three phase power to the linear induction motor 22 may be controlled by a downhole controller (not depicted in FIG. 1) of the downhole tool 20 for purposes of producing the appropriate force or forces to move the mechanical operator 24 in the desired direction.

In other embodiments of the invention, the three phase power for the linear induction motor 22 may be generated downhole. More specifically, in accordance with some embodiments of the invention, single phase power may be communicated from the surface downhole, and a single-to-three phase converter may be present downhole near the tool 20 for purposes of converting the single phase power into three phase power. In yet other embodiments of the invention, single phase power may be communicated downhole, and the linear induction motor 22 may be a single phase motor with a start-up circuit (a split capacitor start-up circuit, for example), which is used to derive the initial forces to move the mechanical operator 24. In yet other embodiments of the invention, direct current (DC) power may be communicated from the surface downhole, and a DC-to-three phase converter may be present downhole near the tool 20 for purposes of converting the DC power into three phase power. To simplify the following discussion, it is assumed unless otherwise noted that the linear induction motor 22 is a three phase linear induction motor. However, other embodiments of the invention are contemplated, as such a design is not necessary for purposes of falling within the scope of the claimed invention.

The electrical lines 14 may also be used for uplink telemetry. Therefore, in addition to communicating electrical power downhole, one or more of the lines 14 may be used to communicate signals to the surface indicative of (as a non-exhaustive list of examples) flow rates, pressures, temperatures, actuator positions, etc.

Figure 2:
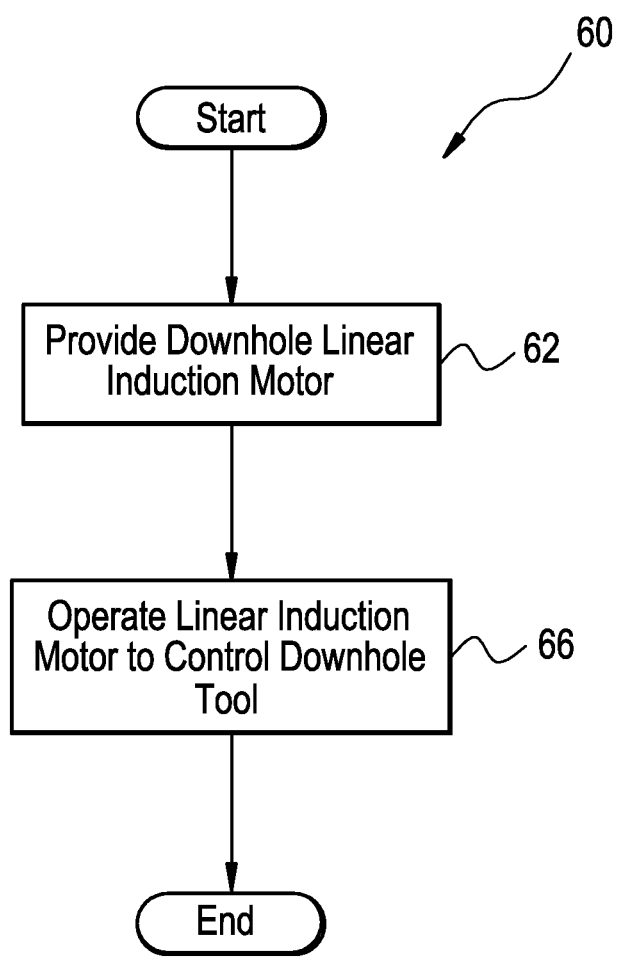
FIG. 2 is a flow diagram depicting a technique to control a downhole tool according to an embodiment of the invention.

Referring to FIG. 2, to summarize, a technique 60 in accordance with embodiments of the invention described herein includes providing (block 62) a downhole linear induction motor. The linear induction motor is operated (block 66) to control the downhole tool.

Figure 3:
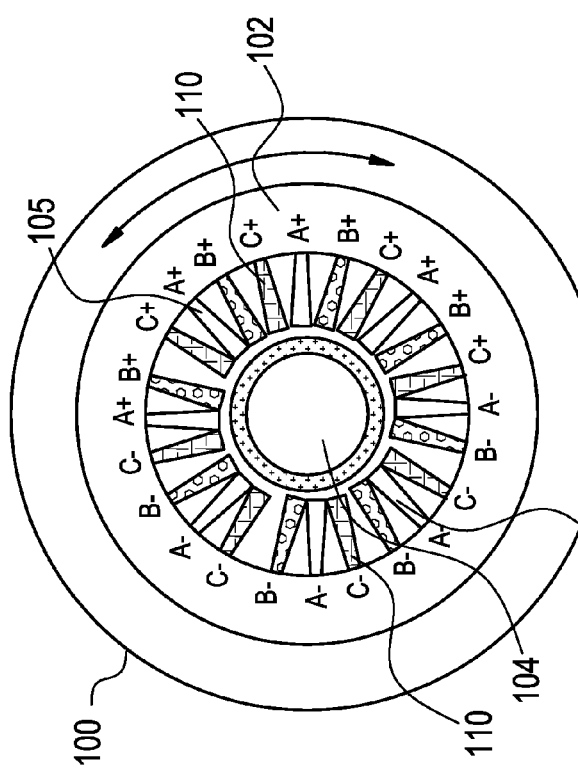
FIG. 3 is a schematic diagram illustrating a rotary induction motor.

For purposes of understanding the design topology and operation of the three phase linear motor, a rotary, three phase induction motor 100 is first described herein in connection with FIG. 3. The motor 100 includes a stationary stator 102 and a movable member called a rotor that is disposed inside the stator 102. The stator 102 includes coils that receive three phase power and generate a corresponding changing magnetic field. Unlike DC brush motors, no brushes or other contact devices are used to communicate power from the stator to the rotor. Instead, the changing magnetic field causes forces to develop on the rotor 104 to impart rotation via magnetic induction. The rotor 104 may be formed from bars, or a "squirrel cage, as an example.

Regarding the three phase coils that are formed in a stator 102 of the motor 100, FIG. 3 depicts the coils which are labeled either as "A," "B," or "C," respectively. Each coil bisects the stator 102, and the "+" or "−" notation is used to densely mate the coils. For example, coil 105 is denoted by the diametrically opposed symbols "A+" and "A−." Likewise, coil 110 is denoted by the symbols "C+" and "C−."

Figure 4:
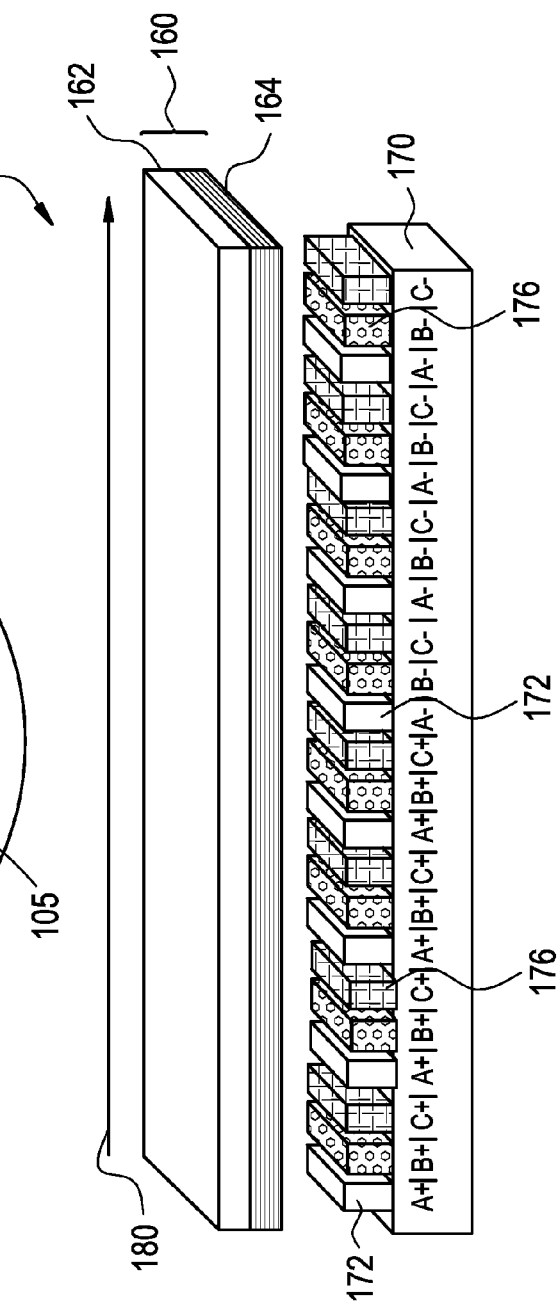
FIG. 4 is a schematic diagram illustrating a linear induction motor according to an embodiment of the invention.

In contrast to the topology of the rotary induction motor 100, in the linear three phase induction motor 22, the rotor 104 and stator 102 of the rotary induction motor are "rolled out flat" along an axis 180, which may correspond to the longitudinal axis of the tool 20 (as an example). Thus, for the linear induction motor 22, the induction motor poles are rolled out flat. FIG. 4 schematically depicts the linear induction motor 22, which includes a flat stator 170 that includes coils that are associated with the three phases (designated by "A," "B," and "C"). For example, a coil 172 is designated by the "A+" and "A−" symbols. Likewise, a coil 176 is denoted by the symbols "C+" and "C−."

Figure 5:
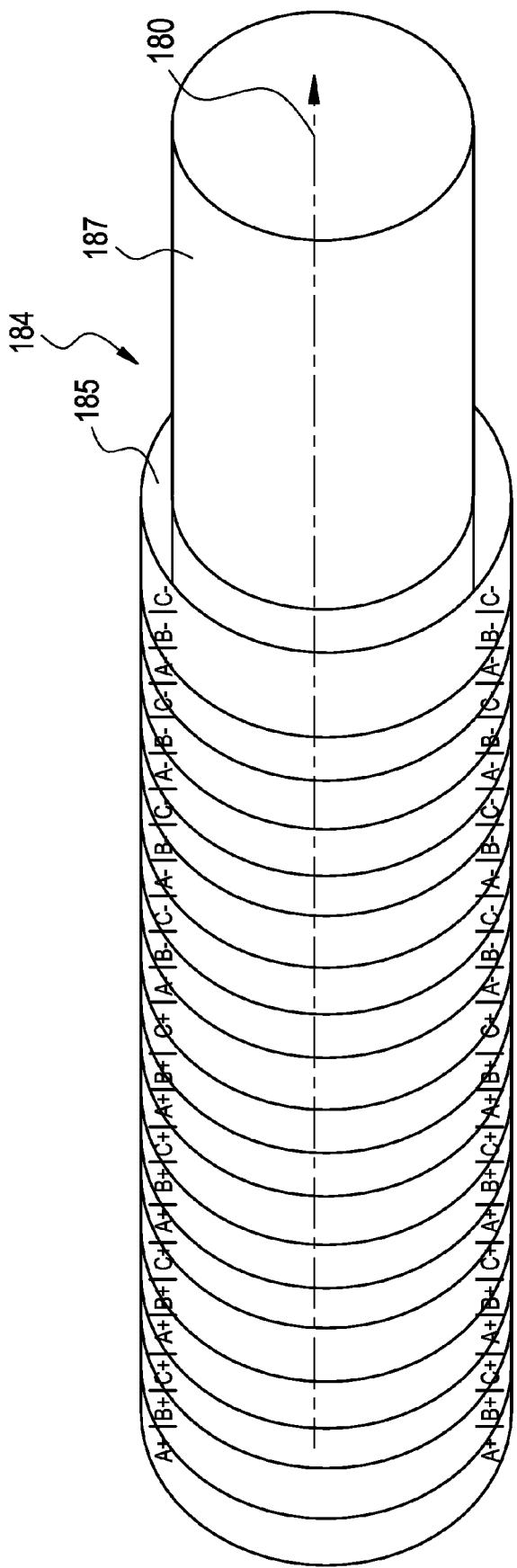
FIG. 5 is a schematic diagram of a tubular linear induction motor according to an embodiment of the invention.

The rotor of the linear induction motor 22 corresponds to an electromagnetic reaction member 160. In accordance with some embodiments of the invention, the electromagnetic reaction member 160 may be relatively flat, and a corresponding stator 170 of the linear induction motor 22 may be relatively flat, as depicted in FIG. 4. However, in accordance with other embodiments of the invention, the linear induction motor 22 may be replaced by a tubular linear induction motor 184, which is depicted in FIG. 5. Unlike the linear motor 22 depicted in FIG. 4, the tubular linear induction motor 184 has a curved stator 185 (corresponding to the flat stator 170 of FIG. 4) and a curved electromagnetic reaction member 187 (corresponding to the electromagnetic reaction member 160). Thus, the tubular linear induction motor 184 may be viewed as being formed by curving the electromagnetic reaction member 160 and stator 170 about the axis 180 (see FIG. 4).

Regardless of whether the linear induction motor is flat (FIG. 4) or tubular (FIG. 5), the electromagnetic reaction member 160 or 187 may be formed by part or all of a tubular member. Furthermore, the electromagnetic reaction member 160, 187 may form at least part of the tool mechanical operator 24 (see FIG. 1). More specifically, the electromagnetic reaction member 160, 187 may be formed from a copper cladding 164, which forms the outer surface of the member 160, 187. The cladding 164 may be bonded to an inner steel material 162. For example, in accordance with some embodiments of the invention, the electromagnetic reaction member 160, 187 may be a composite tube, which has an inner steel material and an outer copper cladding. Other materials may be used in accordance with other embodiments of the invention.

The downhole tool 20 (see FIG. 1) may take on a variety of different forms, depending on the particular embodiment of the invention. For example, the tool 20 may be a packer setting tool positioning mechanism for logging sensors, a choke, a flow control device, a safety valve or a formation valve, as just a few examples. FIG. 6 depicts an exemplary embodiment of a formation isolation valve 200, which may be one form of the tool 20, in accordance with some embodiments of the invention. As shown in FIG. 6, the valve 200 includes an operator member, a flow tube 220, which operates along a longitudinal axis 202 of the valve 200 for purposes of controlling operation of a valve element 210, such as a flapper (as an example).

As shown in FIG. 6, the controller 204 for the tool 20 may be located downhole in proximity to a three phase linear induction motor 206 of the valve 200. In other embodiments, the controller 206 may be located at the seabed or at surface.

In accordance with some embodiments of the invention, the flow tube 220 forms part of the electromagnetic reaction member of the three phase linear induction motor 206. The controller 204 may operate the three phase linear induction motor 206 for purposes of controlling the axial position of the flow tube 220 (thereby controlling whether the valve 200 is in the open state or the closed state).

As shown in FIG. 6, at its downward point of travel of the flow tube 220, the formation isolation valve 200 is in its open state, as the flow tube 220 pushes the valve element 210 open. Thus, in this position, fluid may pass through the valve 200 and through its valve seat 215.

In accordance with some embodiments of the invention, the three phase linear induction motor 206 may be controlled to also retract the flow tube 220, for purposes of placing the valve 200 in its closed state. In this state, the valve element 210 closes off flow through the valve seat 215 to place the valve 200 in its closed state. More specifically, in accordance with some embodiments of the invention, the controller 204 may reverse two phases of the three phase linear induction motor 206, for purposes of moving the flow tube 220 in the opposite direction to allow the valve element 210 to close.

In some embodiments of the invention, the valve 200 may include a hold open mechanism 230, a mechanism that reduces the amount of electrical power that is used to maintain the valve 200 in its open state. Thus, the three phase linear induction motor 206 may be operated to apply sufficient force to open the valve 200; and thereafter, the hold open mechanism 230 may be initiated for purposes of maintaining the valve 200 in its open state without requiring the same degree of opening force (and thus, electrical power) from the linear induction motor 206. As specific examples, depending on the particular embodiment of the invention, the hold open mechanism 230 may be an electromechanical device (a solenoid-operated device), a mechanical "dart" or a latch (as just a few examples known within the safety valve art), which engages the flow tube 220 for purposes of holding the flow tube 220 in a position that maintains the valve 200 in the open state.

In accordance with other embodiments of the invention, the function of the hold open mechanism may be formed from a control routine that the controller 204 executes to control the three phase linear induction motor 206.

More specifically, in accordance with some embodiments of the invention, the controller 204 may cause the linear induction motor 206 to apply two different forces associated with the open state of the valve 200: a first, larger force to open the valve 200 (and thus, open the valve element 210); and a second, smaller force to maintain the valve 200 in its open state. The advantage of using the second, smaller force is that less power is consumed and less power is dissipated into heat for purposes of maintaining the valve 200 open.

As a more specific example, FIG. 7 depicts a technique 250, which may be used by the controller 204 for purposes of opening and maintaining the valve 200 open in accordance with some embodiments of the invention. Pursuant to the technique 250, the controller 204 controls (block 254) the linear induction motor 206 to exert an opening force on the valve operator (such as the flow tube 220, for example). The application of force continues until the controller 204 determines (diamond 258) that the valve 200 is in its open state. It is noted that confirmation of whether the valve 200 is in its open state may be made via pressure sensors, which sense whether flow occurs through the valve, a mechanical sensor that indicates the position of the valve operator or a delay, which allows sufficient time for the operator to move the valve 200 to the open position. Regardless of how the controller 204 ensures that the valve is open, next, pursuant to the technique 250, the controller 204 controls the linear induction motor 206 to exert a hold open force on the valve operator, pursuant to block 268.

In accordance with some embodiments of the invention, the hold open force is significantly less than the opening force, but is still sufficient to maintain the valve operator in the appropriate position to hold the valve open. The regulation of the opening and hold open forces may be achieved by controlling the current, voltage or frequency that is furnished to the linear induction motor 206, in accordance with some embodiments of the invention. The controller 204 maintains the hold open force on the valve operator until the controller 204 determines (diamond 272) that the valve 200 is to be closed.

Stimuli may be communicated from the surface of the well for purposes of instructing the controller 204 to close the valve 200. Other and different mechanisms may be used for purposes of instructing the controller 204 to close the valve 200, in accordance with the many different embodiments of the invention.

After the controller 204 determines that the valve 200 is to be closed, the controller 204 then controls the linear induction motor 206 to close the valve, pursuant to block 276. For example, in accordance with some embodiments of the invention, the controller 204 may remove all applied power to the linear induction motor 206 to close the valve. In accordance with other embodiments of the invention, the controller 204 may reverse two phases of the linear induction motor 206 for purposes of applying a closing force in the direction that is opposite the direction force used to open the valve. Thus, many variations are possible and are within the scope of the appended claims.

FIG. 8 depicts an exemplary embodiment of a safety valve 300, another possible embodiment of the tool 20. The safety valve 300 includes a controller 304 and a three phase linear induction motor 306. It is noted that the controller 304, three phase linear induction motor 306 and a ball element 308 that is operated by the motor 306 may be enclosed in a pressure housing 310. The controller 304 may control the three phase linear induction motor 306 for purposes of controlling the axial position of an operator sleeve 320. More specifically, movement of the operator 320 in a downward direction (as depicted in FIG. 7) causes the ball element 308 to open to allow fluid flow through the valve 300.

Movement of the sleeve 320 in the downward direction is opposed by a coil spring 324 that resides in a chamber formed between the sleeve 320 and the outer pressure housing 310. The spring 324 is contained between an inner shoulder 330 of the housing 310 and a shoulder 328 of the sleeve 320. Thus, when the sleeve 320 moves in a downward direction, the spring 324 opposes the motion. As long as the linear induction motor 306 applies the force to drive the sleeve 320 downwardly, the ball element 308 remains open. However, upon removal of the force, the spring 324 automatically drives the sleeve 320 upwardly to close the ball element 308, thereby closing the safety valve 300. It is noted that this action provides a fail safe mechanism, in that should electrical power be lost, the ball element 308 automatically closes.

Although valves have been described herein for purposes of illustrating possible embodiments of the invention, it is understood that the linear induction motor may be used for generating mechanical forces or controlling motion in downhole tools other than valves. For example, in accordance with some embodiments of the invention, a linear induction motor may be used to operate a packer setting tool. In other embodiments of the invention, the linear induction motor may be used in valves other than formation isolation, barrier and safety valves. For example, in another embodiment of the invention, the linear induction motor may be used for purposes of controlling the flow through a choke or regulating production from a certain valve. As another example, in accordance with some embodiments of the invention, a linear induction motor may be used for purposes of controlling the position of a logging sensor. In this regard, the linear induction motor may be operated for purposes of repositioning the sensor when a logging tool that incorporates the sensor moves. Thus, many applications and variations other than those described herein are contemplated and are within the scope of the appended claims.

Although linear induction motors have been described herein as controlling valves that have two states (i.e., fully open or fully closed), it is understood that a linear induction motor may be used in a tool or valve that has more than two controlled positions. As a more specific example, in accordance with some embodiments of the invention, the linear induction motor may be used in a choke for purposes of throttling or choking flow from a particular production zone. In these embodiments of the invention, the linear induction motor may be used to operate a variable position throttling element for purposes of controlling flow. Thus, the linear induction motor may be used, for example, in intelligent completions for purposes of sand and/or production fluid control. As yet another variation, the linear induction motor may be used in a stepper motor application. As can be appreciated, many variations are contemplated and are within the scope of the appended claims.

Although terms of orientation and direction such as "up," "vertical," "down," etc. have been used herein for purposes of convenience in describing certain embodiments of the invention, the invention may be practiced with directions and orientations. For example, a downhole tool in accordance with embodiments described herein may be used in a horizontal, or lateral, wellbore. Thus, many variations are possible and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A tool usable with a well, comprising:
   a tool operator;
   a linear induction motor to actuate the tool operator; and
   a controller to cause the linear induction motor to apply a first force to the tool operator to transition the tool to a predetermined state and apply a second force smaller than the first force to the tool operator to maintain the tool in the predetermined state.

2. The tool of claim 1, wherein the tool comprises a valve, the tool further comprising:
   a valve element to control flow through a flow path of the valve,
   wherein the valve operator is adapted to transition the valve element to change when actuated by the linear induction motor.

3. The tool of claim 2, wherein the valve operator is adapted to transition the valve element between closed and open states of the valve.

4. The tool of claim 2, wherein the valve operator is adapted to transition the valve element between multiple flow states of the valve between fully open and fully closed states of the valve.

5. The tool of claim 2, wherein the valve element comprises one of the following:
   a flapper, a ball element and a sleeve.

6. The tool of claim 1, wherein the tool operator comprises an electromagnetic reaction member of the linear induction motor.

7. The tool of claim 1, wherein
   the tool operator comprises a first member and a conductive cladding formed on the first member and being formed from a material different from the first member.

8. The tool of claim 1, further comprising:
   a hold open mechanism activated after the tool operator is in a first state to hold the tool operator in the first state.

9. The tool of claim 8, wherein the hold open mechanism comprises one of the following:
   an electromechanical device, a latch, a dart, and a circuit to reduce a force applied by the linear induction motor to maintain the tool operator in the first state.

10. The tool of claim 1, further comprising:
    a closure member to bias the tool operator to the first state.

11. The tool of claim 1, wherein the tool comprises one of a safety valve and an isolation valve.

12. A method usable with a well, comprising:
    operating a linear induction motor to actuate an operator of a tool located downhole in the well, the operating comprising controlling the induction motor to apply a first force to the operator to transition the tool to a predetermined state and apply a second force smaller than the first force to the operator to maintain the tool in the predetermined state.

13. The method of claim 12, wherein the operating comprises:
    actuating the operator to move a valve element to control flow through a flow path of a valve; and
    transitioning the valve element in response to the actuation of the operator.

14. The method of claim 13, wherein the act of transitioning the valve element comprises:
    transitioning the valve element between closed and open states of the valve.

15. The method of claim 13, wherein the act of transitioning the valve element comprises:
    transitioning the valve element between multiple flow states of the valve between fully open and fully closed states.

16. The method of claim 12, further comprising:
    using the operator as an electromagnetic reaction member of the linear induction motor.

17. The method of claim 12, wherein the actuating comprises:
    operating the linear induction motor in a first mode to transition the operator to a first state; and
    operating the linear induction motor in a second mode other than the first mode to transition the operator to a second state.

18. The method of claim 17, wherein the linear induction motor produces more force on the operator in the first mode than a force produced by the linear induction motor on the operator in the second mode.

19. The method of claim 12, wherein the tool comprises one of an isolation valve and a safety valve.

20. A system usable with a well, comprising:
    a valve element;
    a valve operator to transition the valve element from a first state to a second state;
    a linear induction motor to actuate the valve operator to regulate whether the valve element is in the first state or the second state; and
    a controller to cause the linear induction motor to apply a first force to the valve operator to transition the valve element from the first state to the second state and apply a second force smaller than the first force to the valve operator to maintain the valve element in the second state.

21. The system of claim 20, wherein the valve operator comprises an electromagnetic reaction member of a linear induction motor.

22. The system of claim 20, wherein the valve element comprises one of the following:
    a flapper, a ball element and a sleeve.

23. The system of claim 20, further comprising:
    a string, wherein the valve element, the valve operator and the linear induction motor are part of the string.

24. The system of claim 20, further comprising:
power lines to extend from the surface of the well to communicate power to the linear induction motor.

25. The system of claim 20, further comprising:
a three phase converter located downhole in the well to convert single phase power into three phase power for the linear induction motor.

* * * * *